United States Patent [19]

Grenier

[11] 4,188,070
[45] Feb. 12, 1980

[54] BRAKING COORDINATION DEVICE

[75] Inventor: Michel Grenier, Dampmart, France

[73] Assignee: WABCO Westinghouse, Freinville-Sevran, France

[21] Appl. No.: 899,446

[22] Filed: Apr. 24, 1978

[51] Int. Cl.² ............................................. B60T 13/74
[52] U.S. Cl. ......................................... 303/3; 303/15
[58] Field of Search ............................. 303/3, 15-17, 303/20, 25, 28, 29

[56] References Cited

U.S. PATENT DOCUMENTS

| 3,814,483 | 6/1974 | Coiner et al. | 303/3 |
| 3,814,484 | 6/1974 | Matthews et al. | 303/15 X |
| 3,823,984 | 7/1974 | Parfitt et al. | 303/3 |

Primary Examiner—Reinhard J. Eisenzopf
Attorney, Agent, or Firm—R. W. McIntire, Jr.

[57] ABSTRACT

A dynamic/friction brake blending valve device having a piston assembly arranged to operate a pressure regulator via which brake cylinder pressure is controlled. Associated with the relay valve device is an electrical circuit comprising a differential amplifier subject in a first mode of operation to a brake command signal and a dynamic brake signal representing the degree of dynamic brake effort being provided in response to the brake command. An error signal resulting from comparison of the brake command and dynamic brake signals is converted by a transducer to a corresponding fluid pressure that is supplied to a chamber formed between first and second differential pistons of the piston assembly to actuate the pressure regulator and thereby produce brake cylinder pressure corresponding to the deficiency of the dynamic brake. Another chamber formed between the second piston and a third differential piston of the piston assembly may be connected to a pneumatic control valve device that operates in response to brake pipe pressure variations, which may be made independently of the brake command signal, to provide apparatus for obtaining a back-up or emergency brake application in the event an electrical malfunction renders the differential amplifier inoperative. In a second mode of operation, the differential amplifier error signal is replaced by the dynamic brake signal and the brake pipe pressure is adjusted simultaneously with the brake command so as to correspond thereto. In this respect, the brake blending valve device itself accomplishes the comparison function provided by the differential amplifier in the first mode of operation, in order to supplement the dynamic brake with friction brake effort corresponding to any deficiency of the dynamic brake which may arise.

10 Claims, 3 Drawing Figures

BRAKING COORDINATION DEVICE

BACKGROUND OF THE INVENTION

The present invention relates to a system for blending a supplementary brake with a primary brake such as to provide total braking in accordance with a certain chosen brake command.

On railway vehicles, for example, particularly electric locomotives and self-propelled railway transit cars, the traction motors may be operated as electric generators during braking in order to dissipate the dynamic energy of the vehicle in the form of heat via the dynamic braking grids of the vehicle. Since the traction motors are already available for propelling the vehicle during a propulsion mode of operation, this form of braking, commonly referred to as dynamic braking, represents a low-cost means of retarding the vehicle. Unfortunately, however, the slow response upon initiation of braking and a fade characteristic when approaching a stop dictates the use of an additional brake, in particular a friction brake, as a means of making up for any deficiency in the dynamic brake effort attained. As a complement to the dynamic brake, therefore, a friction brake is traditionally employed to assure that the proper brake effort is realized.

Justification for the additional expense brought about by the requirement of a supplemental friction brake when using dynamic braking is the fact that modern rail passenger transportation demands higher speed, safer operation, closer spaced stations, and programmed speed control, all of which add emphasis to the need for a coordinated multi-brake system.

SUMMARY OF THE INVENTION

The object of the present invention, therefore, is to provide a friction/dyanamic brake blending relay valve device capable of being pneumatically actuated from a manual control in the event the electro-pneumatic control corresponding to the difference between brake demand and dynamic brake effectiveness fails, such pneumatic actuation being counteracted by the available dynamic braking effort.

An extension of the above object is to provide a brake blending relay valve device that is further capable of operation in an alternate mode in which the dynamic brake effectiveness signal alone comprises the electropneumatic control and the pneumatic control is continuously present.

In achieving this objective, the relay valve is connected with a first pressure representing the effectiveness of the dynamic brake and with a second pressure representing the degree of braking produced by a pneumatically controlled friction brake, for example.

Comprising the relay valve is a pressure regulator having a supply and exhaust valve via which the brake cylinder pressure is controlled and a piston assembly comprising first and second reaction pistons and a movable piston subject to the first and second pressure such as to actuate the piston assembly to in turn operate the pressure regulator.

In a first mode of operation, an electric circuit is set up to provide the first pressure in accordance with the error difference between a brake demand and the degree of dynamic braking produced thereby. In this mode, the second pressure is controlled independently of the brake demand and normally is withheld for use as a pneumatic backup or emergency control of the friction brake separate from the pneumatic blending control of the friction brake. The absence of the second pressure in the presence of the first pressure causes the movable piston to be disengaged from the piston assembly, such that the relay valve control is under the influence of the error difference between brake demand and dynamic brake effectiveness. In the event of an emergency, the second pressure is provided to cause the movable piston to engage the piston assembly and thereby add a higher force to the pressure regulator to thereby increase the pressure supplied to the brake cylinder.

In a second mode of operation, the electrical circuit is set up to connect the first pressure to the relay in accordance with an electrical signal representing the degree of dynamic brake in effect, while a brake valve device that provides this dynamic brake control concurrently controls the friction brake providing the second pressure. Consequently, the movable piston is engageable with the piston assembly by reason of the second pressure being present as well as the first pressure so that the force transmitted to the pressure regulator via the piston assembly is proportional to the difference between the first and second pressures.

BRIEF DESCRIPTION OF THE DRAWINGS

Other objects and advantages of this invention will become apparent from the following more detailed description when considered in connection with the accompanying drawings wherein.

DESCRIPTION AND OPERATION

Figure 1:
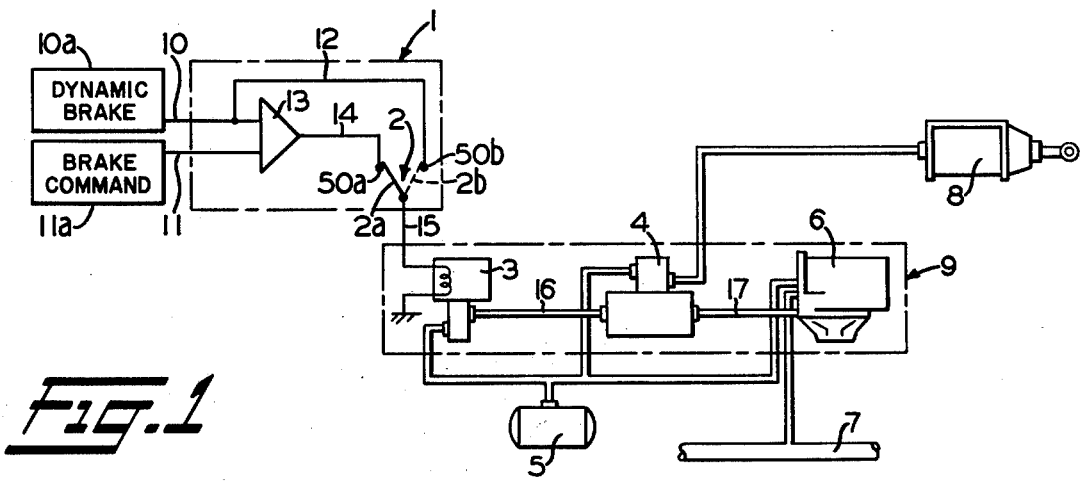
FIG. 1 is a schematic view showing the brake blending relay valve device of the present invention in outline.

The arrangement shown in FIG. 1 is primarily for use in rail vehicles and consists of an electrical circuit 1 supplying a signal proportional to either the retardation effect produced by the dynamic brake when mechanical switch 2 is in the position represented by armature 2b or the difference between this retardation provided by the dynamic brake and a brake command when mechanical switch 2 is in the position represented by armature 2a.

It also comprises an electropneumatic converter 3 and a pneumatic relay 4. In the type of realization shown, the converter is composed of an adjustable electrical valve. The pneumatic relay 4 is fed from an auxiliary tank 5 and is controlled by the pressures coming from the electrical valve 3 and from a conventional braking distributor 6 that is controlled from a main line 7, typically referred to as the brake pipe. The relay 4 feeds or exhausts brake cylinders 8 of a friction brake, as a function of a control force acting on a piston assembly of the relay, in response to the pressure signals from devices 3 and 6. The devices 3, 4, and 6 are mounted and fixed in such a way as to form only a single assembly 9.

Returning to the electrical circuit 1, there are provided two input leads 10 and 11, each receiving, by way of the generating elements 10a and 11a, an analog electric signal representing, respectively, the actual dynamic brake effectiveness and the brake command representing the desired total braking effort of the vehicle. A comparator 13, the inputs of which are respectively connected to leads 10 and 11, produces an electrical error signal transmitted via a line 14 to contact 50a corresponding to position 2a of switch 2, providing electrical connection with an excitation line 15 of the adjustable electric valve 3. In a branch from comparator 13, a line 12 connects line 10 to contact 50b corresponding to the position 2b of the switch 2, so as to feed line 15 with the signal transmitted to line 10.

Before describing in detail the structure of relay 4, the operation of the arrangement in FIG. 1 will be described, such arrangement permitting two different modes of operation.

(a) "Automatic"-type Braking: Switch 2 is in position 2a and line 14 is fed with an electrical signal that is a function (linear, for example) of the deviation between the currents in lines 10 and 11, i.e., the difference between brake command and dynamic brake effectiveness. This electrical error signal is transformed by electrical valve 3 into a pneumatic pressure transmitted by a line 16 to relay 4 in order to control the latter.

In this mode of operation, relay 4 does not normally receive any pressure signal from distributor 6, since the brake pipe pressure in line 7 is controlled by a brake valve device (not shown) separately from the brake command. A pressure that is, for example, proportional to the insufficiency of the dynamic brake is thus the only control to which the relay 4 is operatively responsive. In an emergency situation, however, the brake control line pressure may be varied to cause distributor valve 6 to supply pressure to the relay valve 4 and thereby obtain additional friction braking.

(b) "Manual"-type Braking: Switch 2 is in position 2b and line 12 is thus connected to line 15, the adjustable electrical valve 3 produces in line 16 a pressure that is a function only of the effective action of dynamic braking. Relay 4, by virtue of its construction, to be described in greater detail later with regard to FIG. 2, sends to the brake cylinder 8 a pressure that is a function of the difference between the pressure of line 16 and the pressure supplied by the distributor 6 to the relay 4 by means of a line 17. In this regard, it is a requirement that the dynamic brake control and the distributor 6 are commonly controlled, as by an operator's brake valve device (not shown), which differs from the brake valve device mentioned relative to the above "Automatic"-type braking mode.

In the second case, it is the distributor 6 that establishes the vehicle brake command by virtue of the pressure in line 17, which varies with variation of the brake pipe pressure in line 7 under control of the operator's brake valve device (not shown).

Figure 2:
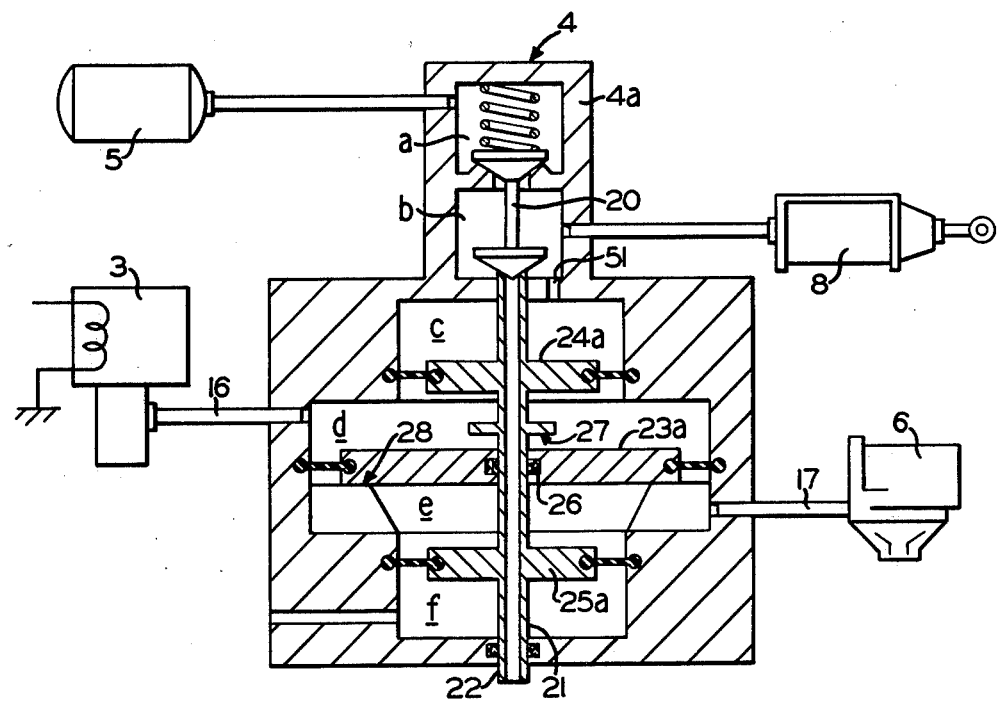
FIG. 2 is a diagrammatic view showing one embodiment of the relay valve in section.

FIG. 2 shows the detailed construction of the relay 4.

This relay 4 contains a double-valve pressure regulator 20 associated with a piston assembly 21. In order to ensure the control of the pressure regulator, piston assembly 21 has, mounted on a tubular exhaust rod 22, a movable piston 23a and two fixed pistons 24a, 25a. These pistons cooperate with body 4a of relay 4 to define several pressure chambers therein; i.e., proceeding from the top to the bottom of FIG. 2: a chamber a connected to the tank 5, a chamber b connected to the brake cylinder 8, a reaction chamber c connected via a calibrated orifice 51 to chamber b, and which is defined by piston 24a, a first control chamber d connected to the electrical valve 3 via line 16 and defined by pistons 23a and 24a, a second control chamber e connected to the distributor 6 via line 17 and defined by pistons 23a and 25a, and a chamber f connected to the atmosphere.

According to the invention, piston 23a is axially movable with respect to the rest of piston assembly 21, its displacement on tube 22 being made air-tight by virtue of a packing seal 26 and its travel in one direction being limited by a collar 27 of tube 22 and in the opposite direction by the stops 28 of the relay valve body 4a.

The effective areas of pistons 24a and 25a subject to the pressure in chambers d and e are the same, whereas the opposite effective areas of piston 23a are greater, as represented by the drawing dimensions $S_1$ and $S_2$. More specifically, the effective adjacent areas of piston 23a and either piston 24a or 25a fit the algebraic expression $n+1,/n$, for example 2:1, 3:2, 9:8, 1.5:0.5 etc.

Figure 3:
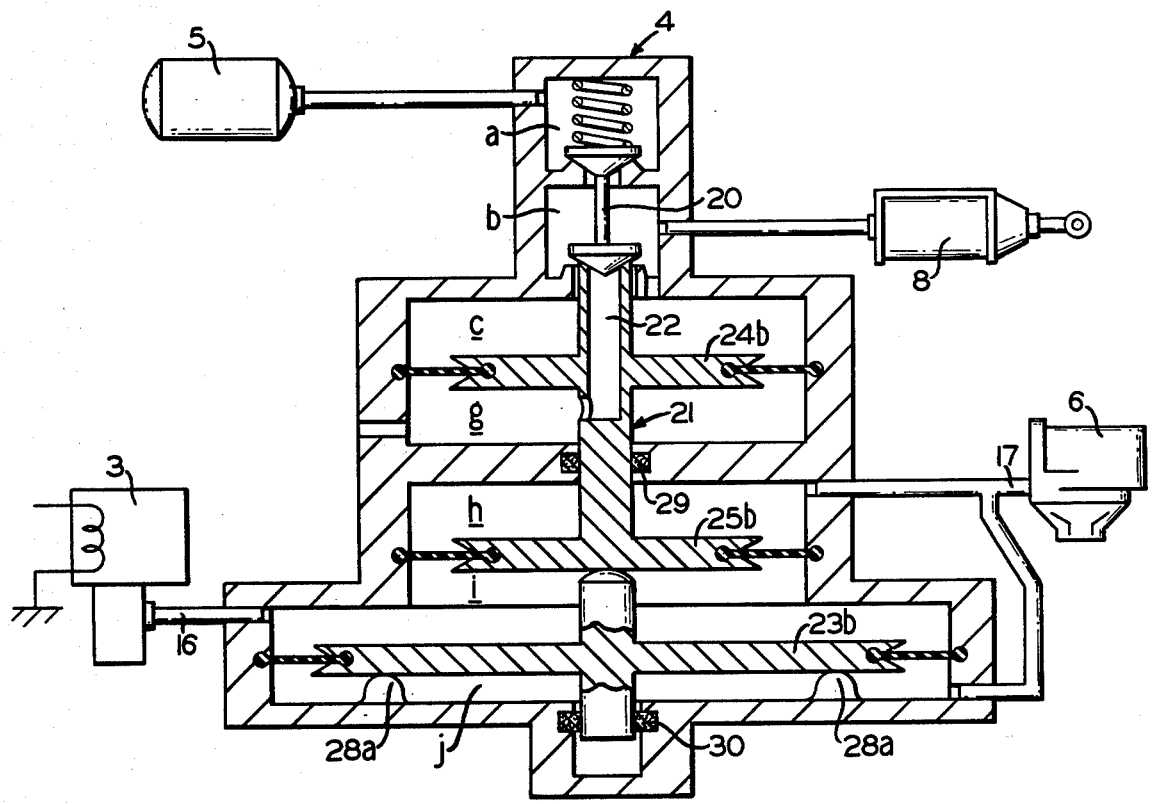
FIG. 3 is a diagrammatic view showing an alternate embodiment of the relay valve in section.

In FIG. 3, the relay 4, according to the invention consists of a piston assembly 21 including two integral pistons 24b, 25b, and a third piston 23b separate from and operative in tandem with pistons 23b and 25b. The piston 24b separates the reaction chamber c from a chamber g open to the atmosphere. The piston 25b separates a chamber h connected to the pneumatic brake distributor 6 from a chamber i connected to the adjustable electric valve 3. The free piston 23b mounted in tandem separates the chamber i from a chamber j connected to the distributor 6. A packing seal 29 separates chambers g and h, and a packing seal 30 similarly separates the chamber j from the atmosphere. The effective area of the piston 24b subject to the pressure prevailing in reaction chamber c corresponds to the effective area of piston 25b subject to the pressure of chamber h is reduced by the area of the rod 22.

The effective pressure area of piston 23b subject to the pressure in chamber i is greater than the effective area subject to the pressure in chamber j by the area of its piston stem. Stops 28a formed on the body of the relay 4 support piston 23b in its lower-most position.

The operation of the relay according to the invention will now be described with reference to FIG. 2:

(a) "Automatic"-type Braking: Switch 2 is placed in position 2a. The chamber d, as already explained, receives a pressure that is a function of the deviation detected between the braking command and the actual dynamic brake effectiveness.

If the dynamic brake is fully effective, the deviation of voltage between lines 10 and 11 is zero, and hence the chamber d remains open to the atmosphere. The chamber e is open to the atmosphere via line 17 and the distributor valve when it is in the "Automatic" braking mode, except when the pressure in main brake control line 7 is varied, such as when initiating an emergency or back-up brake application. The piston 23a thus normally remains inactive in contact with the stops 28. Since the piston 24a is inactive as well, the pressure regulator delivers no pressure to the brake cylinder 8.

On the other hand, in the case in which the dynamic brake is insufficient, the comparator 13 detects a difference between lines 10 and 11, such that the electrical valve 3 delivers a pressure representing the "lack of braking" to the chamber d of the relay 4. While the piston 23a is still inactive by virtue of its being in contact with the stops 28 of the valve body, piston 24a transmits to the tube 22 an upward acting force. Thus controlled, the pressure regulator 20 is operated by the piston assembly to connect the tank 5 with the brake cylinder 8, so that the latter is filled with compressed air until its pressure, retransmitted to the chamber c via the calibrated orifice 51, produces a reaction force on piston 24a, which is accordingly pressure balanced. Pressure regulator 20 is thus positioned to cut off further supply of pressure from tank 5 to brake cylinder 8. If the situation demands an emergency or back-up brake application, the main brake line pressure is varied to cause distributor 6 to pressurize chamber e via line 17, so that the piston assembly is subject to the differential force resulting from the effective pressures in chambers d and e.

If the effectiveness of the dynamic brake begins to increase, the resultant reduction of pressure in chamber d brings about the opening of the exhaust valve of the pressure regulator 20, i.e., the connection of the brake cylinder 8 with the atmosphere, until a pressure balance condition again exists across piston 24a.

(b) "Manual"-type Braking: The switch 2 is placed in position 2b. The braking control in this case is achieved utilizing an operator's brake valve, for example, which valve (not shown) operates to simultaneously produce an operation of the dynamic brake and the distributor 6, the latter in response to a reduction of pressure in the car's main control line 7.

If the dynamic brake functions correctly, the electrical current flowing through lines 10, 12, and 15 and controlling the electrical valve 3 produces in chamber d a pressure equal to that transmitted to chamber e by the pneumatic-braking distributor 6. The piston 23a thus remains disengaged from collar 27 and inactive insofar as exerting any actuating force on the pressure regulator. Also, the pressure in chamber d acting on piston 24a is counteracted by the identical pressure in chamber e acting on piston 25a. Accordingly, all forces acting on the piston assembly are balanced, so that no braking pressure is supplied to brake cylinder 8 via pressure regulator 20.

In the case in which the dynamic brake undergoes a delay, a misfiring, or a reduction in effectiveness, the pressure Pe delivered by the electric valve 3 to the chamber d is lower than that pressure Pd transmitted to the chamber e by the distributor 6. The piston 23a is consequently actuated by this pressure differential and becomes effective by its contact with stop 27 to urge the piston assembly 21 in a direction to open the inlet valve of the pressure regulator 20. The pressure supplied to the brake cylinder 8 via pressure regulator 20 thus provides the exact supplemental friction braking force required to obtain brake effort according to the brake command. This same holds true for the relay 4 of FIG. 3, the detailed operation of which is so similar to that of FIG. 4 as to require no further discussion.

It goes without saying that various modifications may be added to the described relay valve device without necessarily leaving the scope of the invention.

The first pressure may represent the action of several dynamic brakes, which may take the form of a magnetic-flange brake or eddy current brake, or even the slope of the roadway, or of the resistance of the air. One may also conceive of a more complex relay receiving pressures on several pistons, each of which represents the action of a different dynamic brake. The first and/or second pressure or their original electrical signal can be modified in a previously known manner as a function of the load or the speed of the vehicle or even as a function of the lock-up of the wheels. If the relay valve 4 is to be used to control spring applied, pressure released type brake cylinders, a suitable spring may be installed to bias the pressure regulator to an open or brake pressure supply position, with the valve opening and closing actions being reversed relative to the above described operation.

Having now described the invention what I claim as new and desire to secure by Letters Patent, is:

1. In a rail car brake control system having a dynamic brake, a supplemental brake, an electric control circuit providing an error output signal according to the difference between a brake command signal and a dynamic brake signal representing the effectiveness of the dynamic brake, which is under control of the brake command signal, an electro-pneumatic valve device operatively responsive to the error output signal to provide a first control pressure, a main brake control pipe, a pneumatic brake distributor valve operatively responsive to variations of pressure in the main brake control pipe to provide a second control pressure, a reservoir and a brake cylinder device, there is provided a brake blending relay valve device comprising:
  (a) a pressure regulator for controlling the supply of fluid pressure from the reservoir to the brake cylinder and the exhaust of the brake pressure; and
  (b) a piston assembly engageable with said pressure regulator for effecting operation thereof, said piston assembly comprising:
    (i) a first piston subjected on one side to the brake cylinder pressure for urging said piston assembly in a first direction and subjected on the other side to the first control pressure for urging said piston assembly in a direction opposite said first direction,
  wherein the improvement comprises:
    (ii) a second piston subjected on one side to said first pressure for movement in said first direction independently of said first piston and subjected on the other side to said second pressure for urging movement of said first piston in said second direction.

2. The brake system as recited in claim 1, further characterized in that variation of the pressure in the main brake control pipe is controlled independently of the brake command signal to permit selective operation of the brake distributor valve, whereby the second pressure produces an actuating force on said piston assembly in said second direction only when the second control pressure exceeds the first control pressure.

3. The brake system as recited in claim 1 wherein the electric control circuit includes switch means for disconnecting the error output signal from the electro-pneumatic valve device and connecting the dynamic brake effectiveness signal thereto.

4. The brake system as recited in claim 3 further characterized in that variation of the pressure in the main brake control pipe is controlled concurrently with the brake command signal such as to provide correspondence therebetween when said switch means connects the dynamic brake effectiveness signal to the electro-pneumatic valve device.

5. The brake system as recited in claim 2 or 4, wherein said piston assembly further comprises a third piston integral with said first piston and subjected to the second pressure to urge movement thereof in said first direction.

6. The brake system as recited in claim 5, further characterized in that the effective pressure area of said second piston subjected to the first pressure is larger than that of said first piston and the effective pressure area of said second piston subjected to the second pressure is larger than that of said third piston.

7. The brake system as recited in claim 6, further characterized in that the relationship between the effective pressure areas of said second and first pistons subjected to the first control pressure and the relationship between the effective pressure areas of said second and third pistons subjected to the second control pressure is each expressed by the algebraic expression $n+1/n$, where (n) is the effective pressure area of the smaller of said first and second or said second and third pistons.

8. The brake system as recited in claim 7, wherein said second piston is slidably mounted on a stem connecting said first and third pistons, said stem including a stop member with which said second piston is engageable in response to movement thereof in said second direction and from which said second piston is disengageable in response to movement thereof in said first direction.

9. The brake system as recited in claim 8, wherein the body of said relay valve device provides a stop on which said second piston is supported in spaced-apart relationship with said stop member of said stem when said second piston is moved in said first direction.

10. The brake system as recited in claim 7, wherein said second piston is mounted separate from and in tandem with said first and third pistons.

* * * * *